United States Patent [19]

Matsunaga

[11] Patent Number: 4,567,799
[45] Date of Patent: Feb. 4, 1986

[54] SHIFTABLE PINCH ROLL AND STRIP-FEED DEVICE FOR A SLITTER

[75] Inventor: Douglas S. Matsunaga, Chicago, Ill.

[73] Assignee: Braner Enterprises, Inc., Schiller Park, Ill.

[21] Appl. No.: 584,003

[22] Filed: Feb. 27, 1984

[51] Int. Cl.⁴ ............................................. B23D 19/06
[52] U.S. Cl. ....................................... 83/367; 83/449;
  83/480; 83/481; 83/436; 83/649; 226/174
[58] Field of Search ................. 83/367, 444, 445, 446,
  83/449, 479, 480, 481, 649, 650, 564, 424, 436,
  516, 517, 700; 226/174; 242/56.2–56.7

[56] References Cited

U.S. PATENT DOCUMENTS

| Re. 27,918 | 2/1974 | Montquire | 83/479 X |
|---|---|---|---|
| 2,331,230 | 10/1943 | Rippl | 83/436 X |
| 2,665,756 | 1/1954 | Hall | 226/174 X |
| 3,443,488 | 5/1969 | Deslauriers | 83/436 X |
| 4,102,228 | 7/1978 | Peddinghaus | 83/156 |
| 4,226,151 | 10/1980 | Littley | 83/479 |
| 4,255,999 | 3/1981 | Davis | 83/367 |

Primary Examiner—James M. Meister
Attorney, Agent, or Firm—James D. Hall

[57] ABSTRACT

A sled which is mounted between an uncoiler and a multiple-head or arbor type slitter and which carries a pair of pinch rolls and a peeler. The sled is adapted for longitudinal movement between the slitter and the uncoiler to allow indexing of the slitter arbors and feeding of the coil initially into the slitter.

4 Claims, 5 Drawing Figures

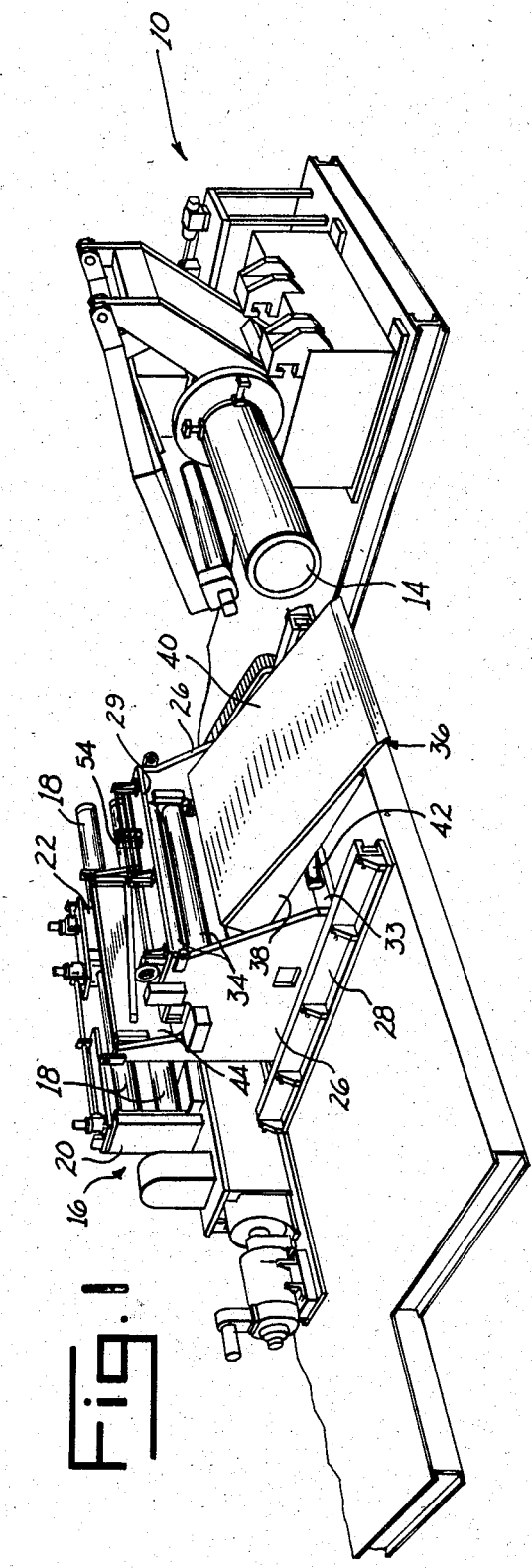
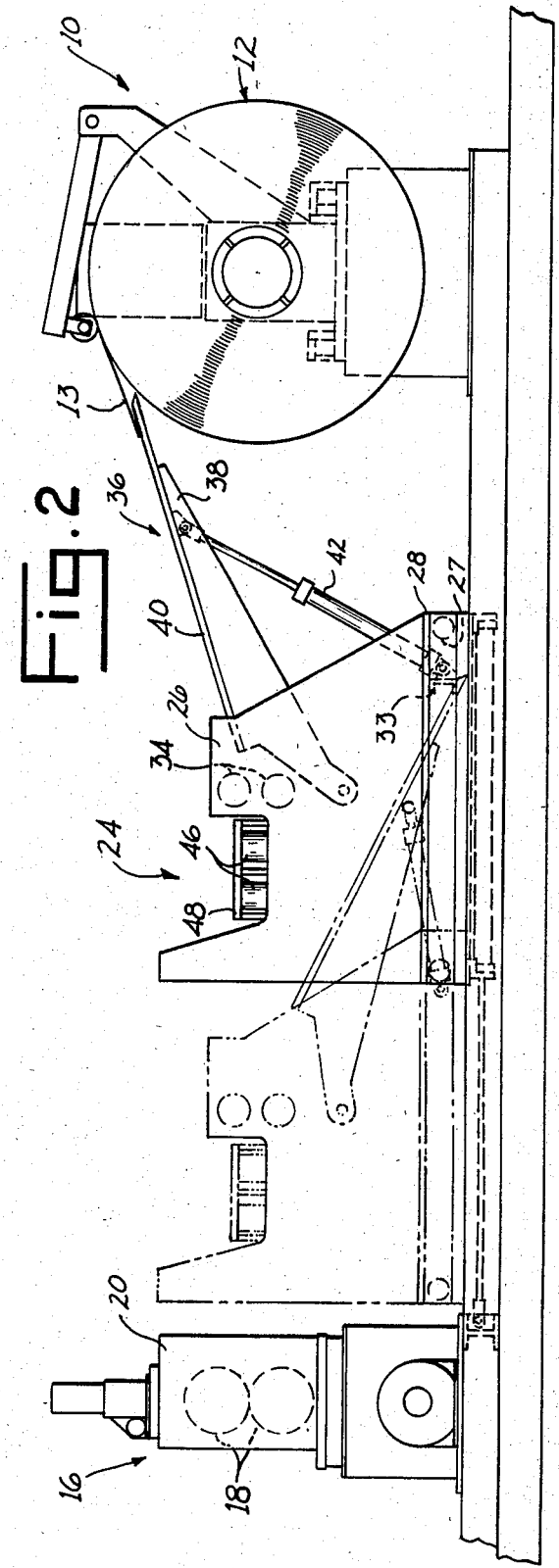

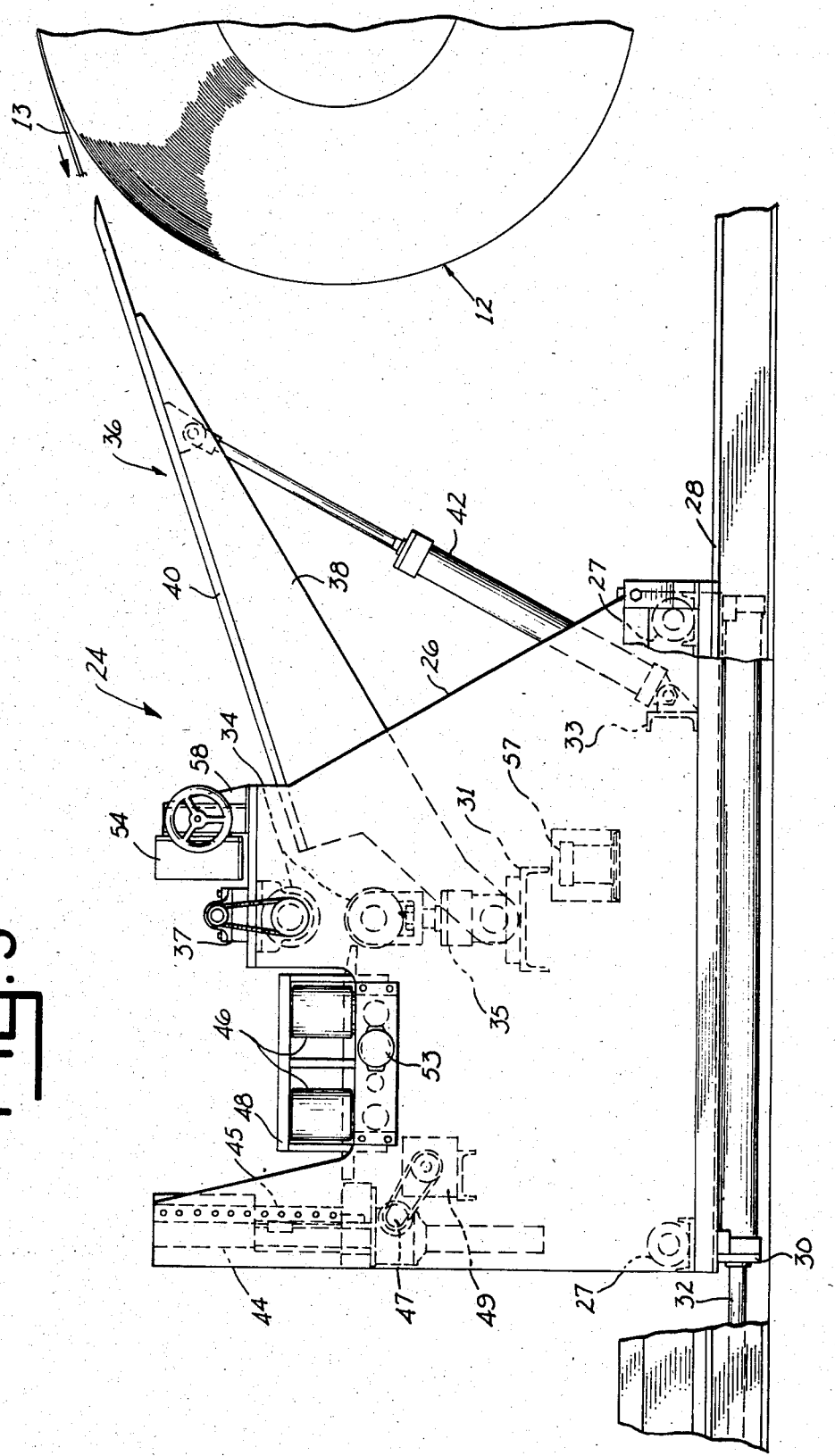

SHIFTABLE PINCH ROLL AND STRIP-FEED DEVICE FOR A SLITTER

BACKGROUND OF THE INVENTION

This invention relates to a device for peeling a layer of material from a coil and threading it into a slitter.

Modern material slitting operations have included the use of a slitter having multiple pairs of arbors mounted for rotation in a general horizontal plane. This arrangement allows for pretooling of one pair of arbors during a slitting operation, and subsequent indexing of the pretooled pair of arbors into the material pass line for a new slitting operation. Examples of such slitters are found in U.S. Pat. Nos. 4,212,218 and Re. 27,918. In nearly all prior art slitters of this type, pinch rolls are mounted near the operational pair of arbors and must be displaced from the material pass line in order to index the pretooled arbors into slitting position. Displacement of the pinch rolls has been done by mounting the pinch rolls for pivotal movement, but such mounting allows the pinch rolls to wobble during use. The pinch rolls have also been mounted for vertical offsetting movement, but this construction greatly necessitates the use of a pit to accommodate the rolls during indexing of the arbors. In all such types of pinch roll constructions, the peeler is a separate unit from the pinch roll mounting.

SUMMARY OF THE INVENTION

This invention uses a sled positioned between the operational pair of arbors of the multiple paired arbor, slitter and a recoiler which moves longitudinally along the pass line. The pinch rolls are carried upon the sled along with a peeler. When the sled is shifted toward the uncoiler, clearance is provided for indexing of the slitter arbors and the peeler is placed in proximity to the uncoiler for threading a new coil into the pinch rolls and the slitter arbors. A space between the slitter and the pinch rolls is also provided when the sled is shifted toward the recoiler to permit easy removal of scrap pieces. Other devices such as a crop shear, an edge control, and side roll guides may also be mounted on the sled.

Accordingly, it is an object of this invention to provide a novel and useful device for threading a slitter.

Another object is to provide a device which mounts a pair of pinch rolls and which provides for clearance of the pinch rolls from a multiple paired arbor slitter during rotation of the slitter.

Another object is to provide a device which allows a slitter to rotate unobstructed by the pinch rolls to index a pair of arbors into position for a slitting operation.

Another object is to provide a device which carries pinch rolls and is shiftable away from the slitter between slitting operations to allow for removal of scrap pieces from the slitting line.

Other objects will become apparent upon a reading of the following description.

BRIEF DESCRIPTION OF THE DRAWINGS

FIG. 1 is a perspective view of a slitter line showing an uncoiler, the sled of this invention, and a slitter.

FIG. 2 is a side view of the slitter line of FIG. 1 showing two positions of the sled.

FIG. 3 is a side elevational view of the sled showing the peeler in its operative position.

DESCRIPTION OF THE PREFERRED EMBODIMENT

Figure 4:
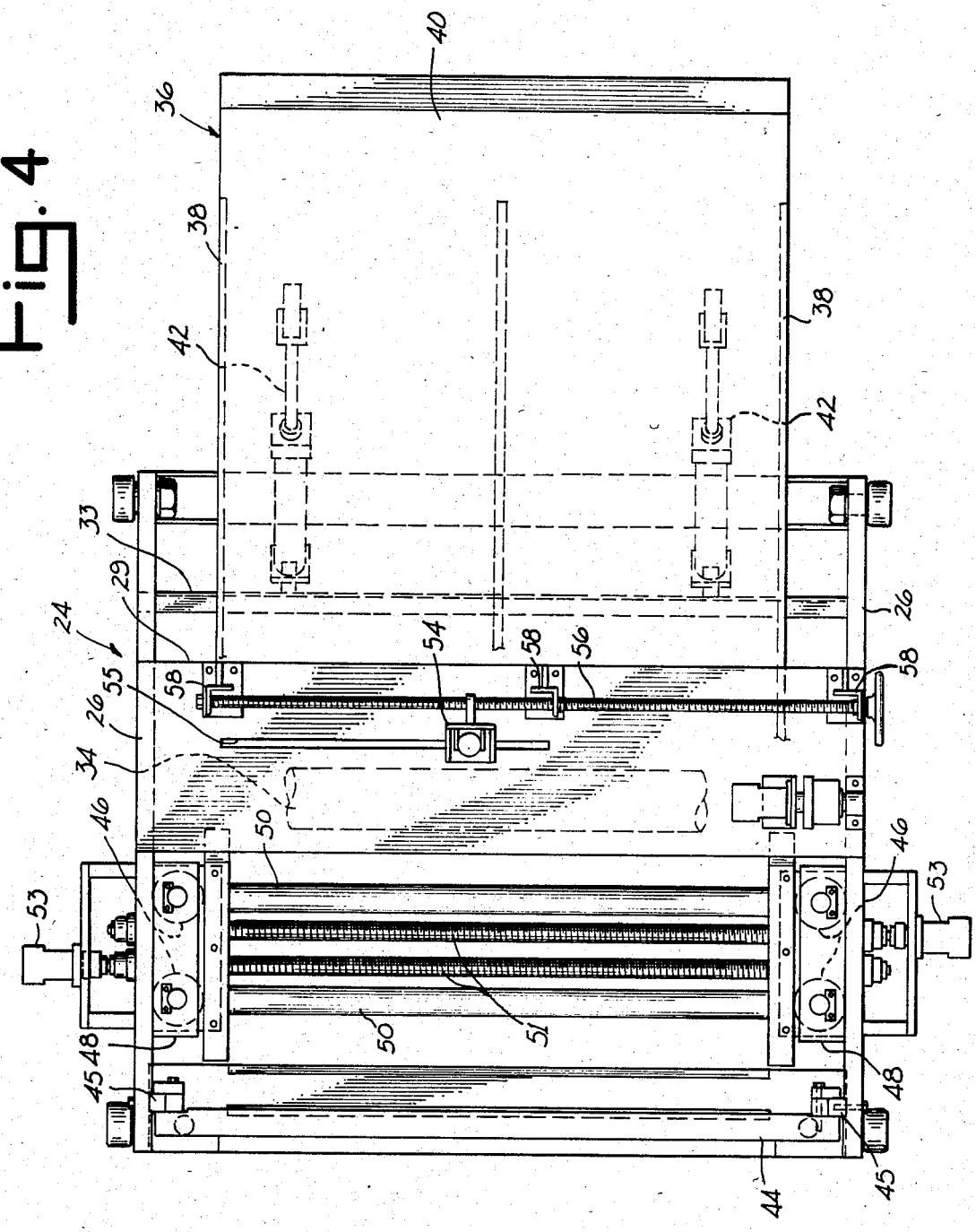
FIG. 4 is a top view of the sled.

The preferred embodiment illustrated is not intended to be exhaustive or to limit the invention to the precise form disclosed. It is chosen and described in order to explain the principles of the invention and its application and practical use to thereby enable others skilled in the art to utilize the invention.

This invention is intended for use in a slitter line, such as illustrated in FIGS. 1 and 2. A slitter line typically includes an uncoiler 10 having a coil 12 of sheet material 13 carried on an arbor 14. A slitter 16 is also used in the slitting operation and includes multiple pivoted spaced pairs of arbors 18. Arbors 18 are typically journaled at one end in a bearing housing 22 and are rotatable in generally horizontal planes about a vertical axis. During a slitting operation where one pair of arbors 18 is being used, another pair of arbors 18 may be pretooled for a subsequent slitting operation. The pretooled arbors 18 are rotated or indexed into the pass line of the material 13 from coil 12 in preparation for another slitting operation. The outboard bearing housing 20 is then coupled to the free end of the pretooled arbors. The detailed construction and operation of slitter 16 is found in U.S. Pat. No. 4,212,218. The multiple-head type slitter of U.S. Pat. No. Re. 27,918 can also be used in the slitter line. Both such patents are incorporated herein by reference.

The invention includes a sled 24 positioned between uncoiler 10 and slitter 16 within the material pass line (the path the material follows from uncoiler to the recoiler). Sled 24 includes spaced, parallel frame members 26. Frame members 26 carry rollers 27 at their lower edges for longitudinal movement along rails 28. Frame members 26 are connected by an upper cross member 29 and lower cross members 30. A hydraulic cylinder 32 is connected between cross members 30 and slitter 16 to cause sled 24 to shift between its solid line extended position and broken line retracted position shown in FIG. 2. An alternate way of providing motion for sled 24 could include mounting the sled to rails 28 via motor rotatable wheels (not shown).

Figure 5:
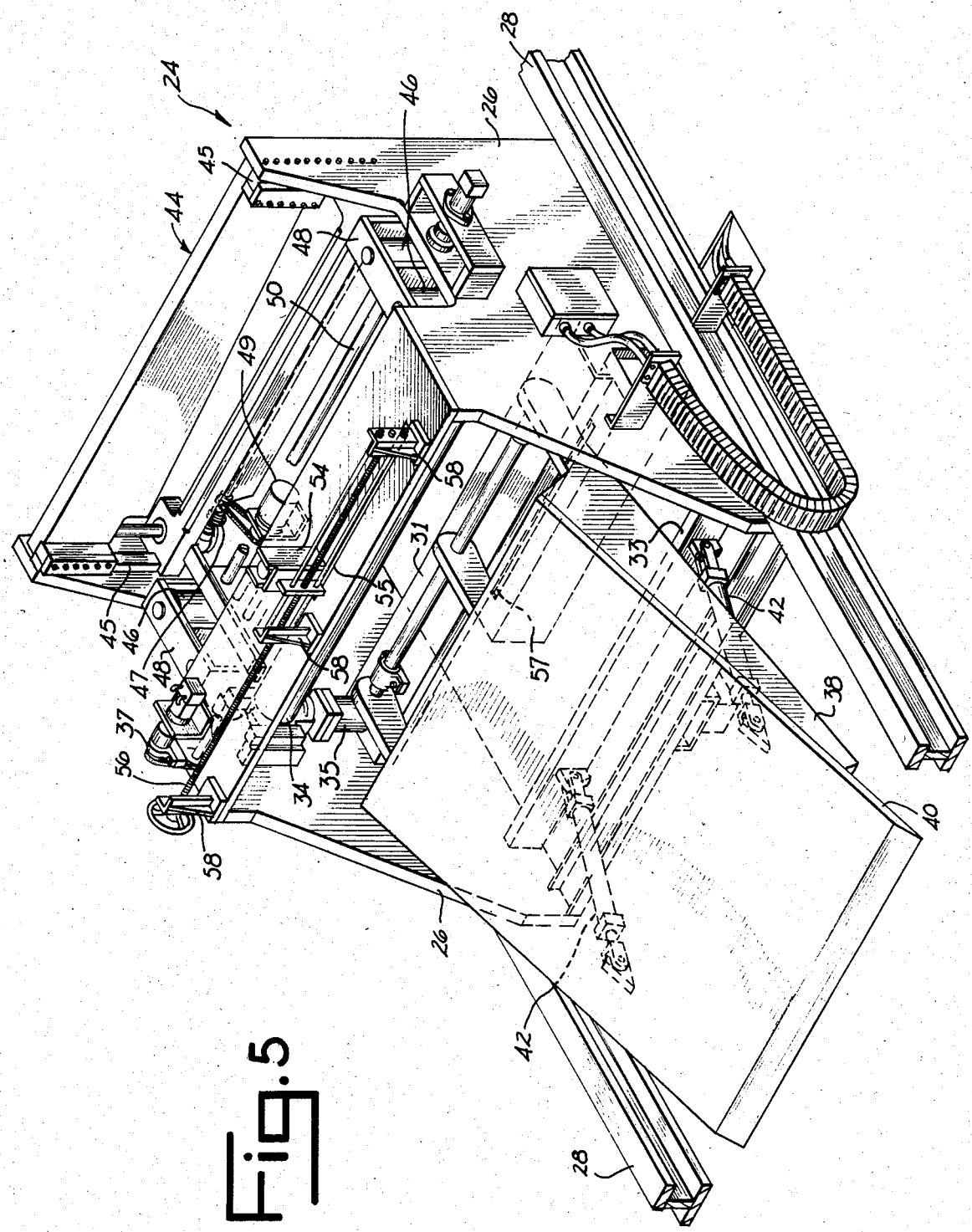
FIG. 5 is a perspective view of the sled.

A pair of pinch rolls 34 are journaled between sled frame members 26. The lower roll of pinch rolls 34 is shiftable toward and from the upper pinch roll by side mounted hydraulic cylinders 35. The upper pinch roll is power driven by motor drive 37. A peeler 36 is pivotally mounted at one end to a cross member 31 extending between frame members 26 in back of pinch rolls 34. Peeler 36 includes lower arm members 38 to which a plate 40 is rigidly connected. Peeler plate 40 is tapered at its distal end to assist the peeling operation. Hydraulic cylinders 42 are connected between a cross member 33 and plate 40 to shift peeler 36 between its lower inoperative position shown in FIGS. 1 and 5 and its raised, operative position, shown in solid line in FIG. 2.

A crop shear 44 is mounted to sled 24 in guide 45 carried by frame member 26 in front of pinch rolls 34. Crop shear 44 is used to trim the leading edge of the sheet material 13 from coil 12 and is moved up and down by a pair of worm gear drives 47 powered by motor 49. Side guide rollers 46 are carried by frame member 26 and are rotatable about vertical axes. Guide rollers 46 are positioned between pinch rolls 34 and shear 44 and are intended to contact the side edges of sheet material 13 as it passes through slitter 24. There is a pair of guide rollers 46 located at each side of the material pass line. Each guide roller pair is mounted to a carrier 48 which rides on cross shafts 50. The lateral position of each carrier 48 is positioned through the rotation of a screw 51 which is rotated by a motor 53 and makes threaded contact with the carrier.

An electronic edge sensing unit 54 is carried above upper cross member 29 by a screw 56 journaled in brackets 58 mounted to the upper cross member. Edge sensing unit 54 is a photo cell intended to detect the absence of light through a slit 55 in cross member 29 from a lower lamp 57 at the lateral edge of sheet material 13 as it passes through sled 24 from uncoiler 10. Edge sensing unit 54 is electrically connected to uncoiler 10 such that, if the lateral edge of sheet material 13 becomes displaced, arbor 14 of the uncoiler will shift laterally to correct the displacement.

In the operation of the slitter line shown, sled 24 will be shifted by cylinder 32 along rails 28 toward uncoiler to allow the pretooled pair of arbors 18 to be rotated and positioned across the material pass line. This position of sled 24 is shown in solid lines in FIG. 2. Peeler 36 is raised to allow the leading edge of the sheet material 13 to be peeled from coil 12 and fed between the open pinch rolls 34. The pinch rolls are closed and peeler 36 lowered. Sled 24 is then shifted into broken line position shown in FIG. 2, pulling the sheet material 13 from coil 12. The pinch rolls 34 are then driven to allow squaring of the leading edge of the material by shear 44 and the subsequent feeding of the material into the awaiting pair of arbors 18. The pinch rolls are opened, and the side guide roller 46 and edge sensing unit 54 approximately adjusted for the slitting operation.

It is to be understood that the invention is not to be limited by the terms of the above description but may be modified within the scope of the appended claims.

I claim:

1. In combination, a slitter having multiple pairs of arbors, said pairs of arbors being generally radially oriented and rotatable in a general horizontal plane whereby one selected pair of arbors can be positioned across a material pass line and a second pair of arbors can be pretooled for a subsequent slitting operation, an uncoiler having arbor means for carrying a coil of sheet material, and a sled positioned between said slitter and said uncoiler, said sled carrying a pair of pinch rolls and a peeler, means for mounting said sled for shiftable movement along said material pass line between a position adjacent the slitter and an extended position spaced sufficiently from the slitter to allow rotation of said second pair of arbors across the material pass line, and means mounting said peeler for movement between a lowered inoperative position and an upper operative position for directing the leading edge of said sheet material from the uncoiler towards said slitter when the sled is in its said extended position.

2. The combination of claim 1 wherein said sled includes a shear means for squaring said leading edge of the sheet material.

3. The combination of claim 1 wherein said sled carries a sensor means for detecting the lateral position of said sheet material as the sheet material passes between the uncoiler and slitter along said material pass line.

4. The combination of claim 1 wherein said sled includes spaced guide roller means mounted on opposite sides of said material pass line for contacting the lateral edges of said sheet material as the sheet material passes between the uncoiler and slitter.

* * * * *